United States Patent [19]
Miles

[11] Patent Number: 5,175,625
[45] Date of Patent: Dec. 29, 1992

[54] VIDEO IMAGE CREATION SYSTEMS COMBINING OVERLAPPING STAMPS IN A FRAME PERIOD BEFORE MODIFYING THE IMAGE

[75] Inventor: Barry D. R. Miles, Newbury, Great Britain

[73] Assignee: Quantel Limited, Newbury, England

[21] Appl. No.: 827,513

[22] Filed: Jan. 22, 1992

Related U.S. Application Data

[63] Continuation of Ser. No. 680,774, Apr. 2, 1991, abandoned, which is a continuation of Ser. No. 471,026, Jan. 26, 1990, abandoned, which is a continuation of Ser. No. 396,812, Aug. 21, 1989, abandoned, which is a continuation of Ser. No. 273,652, Nov. 18, 1988, abandoned, which is a continuation of Ser. No. 206,992, Jun. 8, 1988, abandoned, which is a continuation of Ser. No. 851,110, Apr. 14, 1986, abandoned.

[30] Foreign Application Priority Data

Apr. 20, 1985 [GB] United Kingdom ............. 8510137
Aug. 9, 1985 [GB] United Kingdom ............. 8520053

[51] Int. Cl.⁵ ............................................. H04N 5/262
[52] U.S. Cl. ................................. 358/183; 358/22; 340/723; 395/100
[58] Field of Search ............... 358/183, 27, 160, 166; 364/521, 522, 523; 340/723

[56] References Cited

U.S. PATENT DOCUMENTS 4,371,893  2/1983  Rabeisen ............................ 358/183
4,439,783  3/1984  Nishikawa .......................... 358/183

Primary Examiner—Tommy P. Chin
Attorney, Agent, or Firm—Cooper & Dunham

[57] ABSTRACT

A system for creating video images by 'drawing' on a touch tablet with a stylus. Addresses designated by the stylus are translated by a computer (16) into addresses in a frame delay store (13). The operator may choose an artists implement, the effect of which is simulated in the image by brush stamp signals representing the distribution power of the implement. Brush stamp signals are provided for a patch of signals round a designated address. During a frame period the brush stamp signals are processed to produce signals representing the effect of overlapping brush stamps for a portion of a line drawn in that period. The store is a frame delay store where the stored signals are continuously recycled. During a cycle of the store signals corresponding to the addresses covered by the brush stamps are sequentially up-dated by combining with incoming video signals in proportions determined by the brush signals. This produces the effect on a screen of a line drawn with the chosen implement.

19 Claims, 15 Drawing Sheets

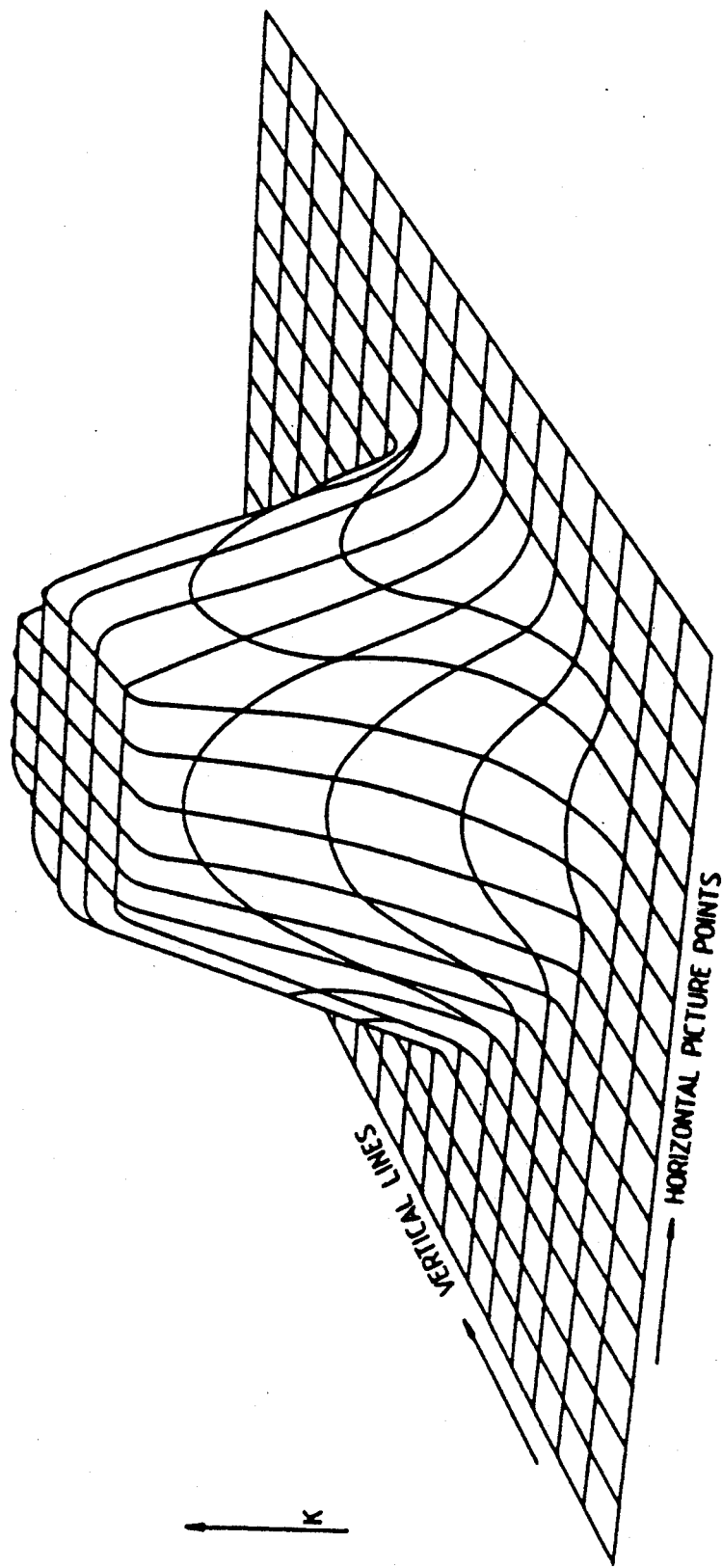

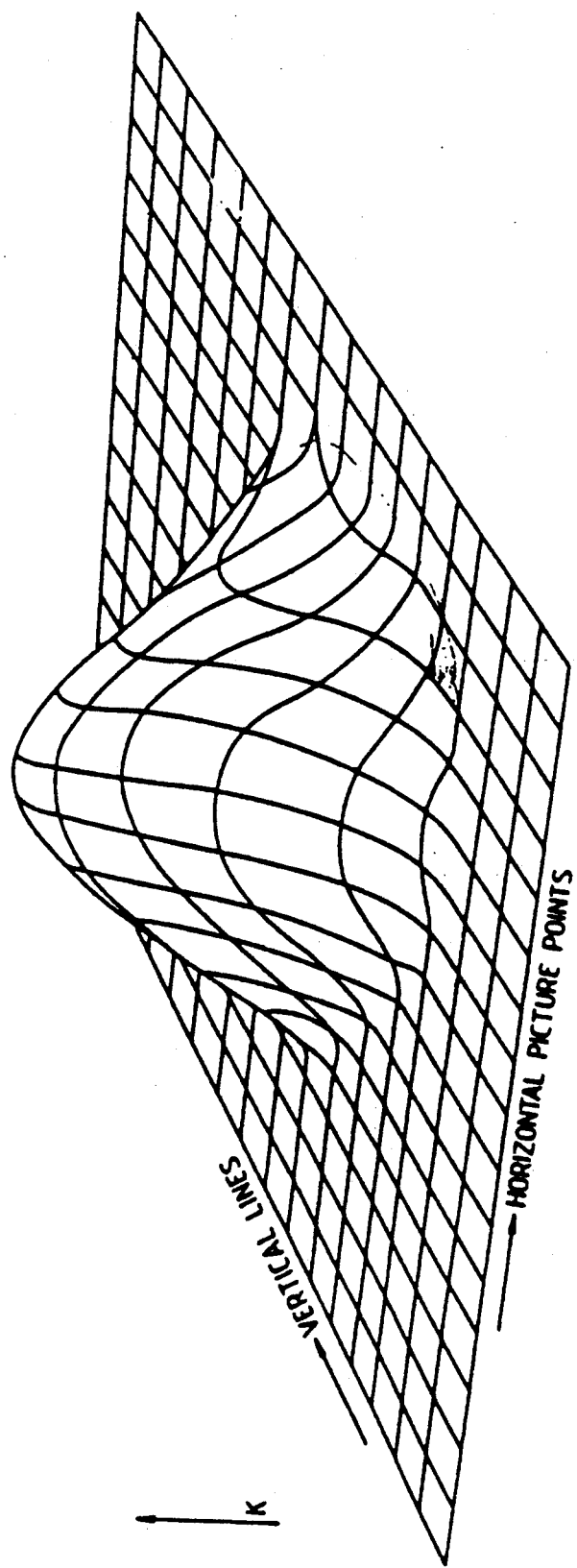

VIDEO IMAGE CREATION SYSTEMS COMBINING OVERLAPPING STAMPS IN A FRAME PERIOD BEFORE MODIFYING THE IMAGE

This is a continuation of application Ser. No. 07/680,774, filed Apr. 2, 1990.

FIELD OF THE INVENTION

This invention relates to improvements in video image creation systems.

BACKGROUND OF THE INVENTION

A prior art system for video image creation is described in commonly owned U.K. Patent Publication 2 098 625 and is shown in FIG. 1 hereof. FIGS. 1-11 of said U.K. Patent Publication are included in this specification as FIGS. 5-15, respectively. This specification includes under this heading the disclosure of said U.K. Patent Publication, with appropriate changes of figure numbers. The symbol "'" has been added to each reference numeral in the figures and text taken from said U.K. Patent Publication and added to this specification. The system is controlled via a touch tablet/stylus combination and a keyboard (not illustrated) and is capable of producing video images that resemble closely those that would be produced using conventional artists materials. To achieve the realism incoming signals and stored signals are mixed so that there is a blending and this blending is controlled by a distribution signal related to the distribution power of the implement which is being simulated. For example, if the operator wishes to draw a stroke on the screen that simulates the use of a wide brush and real paint the operator 'draws' a line on the touch tablet using the stylus and chooses, say, the color red and the implement 'wide brush'. The computer 1 receives signals from the touch tablets representing the co-ordinates of points along the line and also command signals for the type of brush and the color. To achieve the desired effect of a wide stroke in the final image, a patch of picture points adjacent and including each designated picture point must be processed. Taking the co-ordinate signal for the first point on the line the computer produces a corresponding address in the frame store in which signals representing the picture being created are accumulated so that when the signals in the store 2 are read and applied to a color TV monitor the first point in the line will appear on the screen of the color monitor in the position indicated by the stylus on the touch tablet. The address produced by the computer is the address of the corner of the patch of picture point signals to be processed. The computer also causes video signals representing red to be loaded into a patch of locations in the patch RAM 3 and the distribution signals for a wide brush to be loaded into a patch of locations in the shape RAM 4. The distribution signal represents the effect produced by a wide brush with white paint on a black background, i.e. the intensity distribution produced by the selected implement.

Starting from the corner address of the patch the computer generates the addresses of all points in the patch referred to the frame store 2 and for each address generated the signals for that address are read from frame store 2 and patch store 3 into processor 5, which comprises two multipliers 8 and 9 and an adder 10. The processing is done picture point by picture points. The distribution signal for each address is also made available to processor 5 from the shape RAM 4, after being multiplied in 6 by a factor related to the pressure of the stylus on the touch tablet and being perhaps multiplied in multiplier 7 by a stencil signal, and it is applied as a multiplication factor K to the multiplier 8. The complement of K, namely $1-K$, is produced by the circuit 11 and applied to the multiplier 9. The output of the processor for each picture point can be seen to be $KA+(1-K)B$ where A is the new signal derived from RAM3 and B the stored signal in store 2 and so the value of K determines the proportions of incoming and stored signals which make up the new image signal. The image signals in the frame store 2 are also read and rewritten in the store 2 cyclically in TV raster format, so that the image being created can be displayed on the TV monitor.

Once each picture point within the patch has been processed the computer generates the address for the corner of the next patch and the processing then runs through this patch. Each patch is called a brush stamp and to produce a continuous line on the screen the brush stamps will have to overlap so signals for some picture points will be processed a plurality of times for one line. The system operates at a speed such that the lines are seen on a monitor at essentially the same time as the operator draws them. It will be understood that this is a simplified explanation of the system and it will in fact operate on three video signal components separately, say for example R, G, B signals.

This system produces images which are very close to those produced using paint on paper etc. although the images are made up from color video signals and viewed on a color T.V. monitor. However, the system requires random access to the frame store, for updating the image in response to each application of the stylus, which access is interleaved with the normal reading of the video signals in TV raster format for display or refresh purposes. In addition to this complication, the use of a random access store as the frame store for the video signals, which is necessary for the processing, is costly.

There are a number of standard computer peripherals available that permit "computer graphics" to be generated entirely electronically. These can take the form of vector or raster displays with the input means usually some form of touch tablet on which the operator can draw and see the results of this work in real time on the electronic display.

The system of particular interest to the broadcaster, amongst others, is that of the raster display configuration where the display itself can take the form of a normal colour TV screen and thus the video from the computer can be broadcast directly. The obvious use of such a system is to allow the graphics used to much in modern productions to be generated electronically rather than the traditional pencil and paper or "cut and stick" techniques that are both time consuming and expensive in materials.

A typical known electronic graphics system is shown in FIG. 5 comprising a touch tablet 10', a computer 12', a framestore 13' with associated colour generation RAMs 14'-16' for the display 17'. An artist draws with the stylus 11' of the touch tablet and the computer 12' registers the coordinates (x,y) of the stylus whilst remembering the selected colour with which the artist has chosen to draw. The computer then feeds the appropriate addresses to the framestore 13' where the pixel at that address is modified to hold the code corresponding to the chosen colour which it receives as incoming data. As the framestore is read at normal broadcast video rates than the lines, or pictures, drawn by the artist are visible on the display. It is found in practice that, providing the display is directly in front of the touch tablet, the fact that the artist is not watching his hand but the screen provides no problem.

It is possible to use the computer to designate the stylus size so as to be several picture points in diameter for example so that the lines on the 'drawn' image will be of a designated width, as though drawn with a larger stylus. This is achieved by controlling the writing of data into the frame store so that adjacent picture points receive the incoming data also.

The colour for display is generated from the RAM stores 14'–16' handling the Red, Green or Blue component respectively to generate the desired colour combination. (Equal amounts of R, G and B components will produce a monochrome image of a certain intensity.) If the data from frame store 13' is 8 bits wide, this will allow 256 different 'partial colour' combinations. The capacity of the RAMs is selected accordingly. The various colour parameters are fed into the RAMs from the computer and can be updated as desired. During normal operation the RAMs operate as ROMs in dependence on the frame store output.

Now the system described represents a fairly common application of digital techniques and there are already a number of such units available.

In the system as described, the path from the touch tablet to the framestore and the display via the computer is all unidirectional, since the computer only writes to the framestore and does not read from it (and in such a system makes no use of the information held in the framestore).

The style of pictures drawn with such a machine can be of very high quality but cannot fall into the category of "fine art", or, put another way, they are more impressionistic than realistic. This is caused by the nature of the hard "electronic" lines being a far cry from the textures and tonal qualities of the more conventional artists tools.

This electronic nature of the pictures is further emphasised by the fact that existing systems are 'partial' colour (as shown) systems rather than 'full' colour, that is to say, the framestore only has 256 possible combinations in each pixel and a colour can be allocated to each combination. Thus only 256 hues, saturations or luminance levels are possible on the screen for any given picture. Any true pictorial representation of a scene would have far more combinations than this.

The system of the present invention seeks to arrive at a much closer electronic analogy of the normal artists tool in order that the operator might still move the stylus but that the results on the screen make it appear he is genuinely working with a pencil, paint brush, or other implement.

According to the invention there is provided a video image creation system comprising means for providing image data pertaining to at least one picture point allocated to a designated coordinate location and processing means for processing the image for each designated coordinate location from both current and previously derived image data.

Further according to the invention there is provided a video image creation system comprising drafting means operable by an operator to designate positions on a desired image, storage means having means for storing signals representing values of a characteristic of the image, such as intensity or colour, at storage locations representing points on a raster of image points, means responsive to operation of said drafting means to produce a signal representing a new value of said characteristic relevant to a position designated by said drafting means, processing means for combining proportions of said produced signal and any signal stored in the corresponding location in said storage means, and means for storing the resultant of the combination in the corresponding location in said storage means.

As already described with regard to the prior art arrangement of FIG. 5, such a prior art system can designate the stylus size but the resulting image drawn via this stylus is rather impressionistic due to the hard electronic lines. Considering this prior art system operating in black and white (monochrome) then assuming the stylus width to have been selected to be 7 picture points (centred on picture point 4) then the intensity will correspond to that shown in FIG. 6(*a*). In order to move towards a more natural image, the first consideration was to vary the intensity so that it was reduced towards the edges of the stylus as shown in FIG. 6(*b*). The shape was initially calculated by considering a cylinder projected onto a matrix of pixels. In the centre there is full intensity but at the edges where the cylinder only partially covers a pixel a correspondingly reduced intensity is used. Whilst this gives the correct softening effect to the edges to provide an improved image on a raster display, this only goes some way to overcoming the problem as the algorithm has no knowledge of the background and consequently produces a halo effect.

It has been found that in order to produce a more realistic image it is necessary to provide a contribution from the 'background' on which the image is drawn when synthesizing this image. The background can correspond to the paper or can be part of the image already created.

The stylus may be considered as though it were a pencil having a point which may be drawn across the paper to form lines. The end of the pencil has a 'distribution' and this distribution varies whether it is a lead pencil, a coloured pencil, a crayon or charcoal or other implement. To emulate the artists tools, as the stylus is moved across the touch tablet, it must not just fill the pixels corresponding with its address with the appropriate colour, it must form a distribution around the point in question just as the real life pencil, crayon or charcoal does.

If the stylus is now considered as if it were a paint brush then further aspects need investigation, since the type of paint it is carrying also matters. A brush fully loaded with poster paint is very similar to the pencil situation since it simply replaces the colour of the paper with that of the paint according to a certain distribution. However, water colours and oil paint depend not only on what paint is loaded on the brush but also what paint is on the paper. The brushes still have distributions but not the simple type of pencil that has one simple peak, the brush can have many peaks (the stipple), lines (the oil), or just a single peak (the traditional camel hair) but all have little or no temporal content, i.e. little or no build-up if the pencil or brush is held over the point.

Thus we have found that instead of having to write just one point or several points of equal value for each position of the stylus on the touch tablet, a distribution of luminance and chrominance levels have to be written around the point in question to simulate the action of the pencil or paint brush. At the extreme edge of the influence of the pencil there is a very small contribution from the pencil and a large contribution from the background whilst at the centre of the pencil, the contribution is nearly all from the pencil.

Considering FIG. 7, the small squares represent picture points and the vertical axis the contribution from the pencil. The curve shown could be typical for a broad pencil whereas FIG. 8 more accurately shows a narrow fine point pencil.

The contribution (K) for the pencil in FIG. 7 and 8 is complemented by the contribution supplied by the background, which background may be the paper or the pencilled image already laid down. In other words, as the contribution from the pencil decreases, the contribution from the background increases and vice versa. Thus information on this background must be made available during image synthesis.

In the situation where the shape is calculated from a cylinder, as mentioned above, this in practice produces a sharp pencil like result when handled by the raster display. The uniform 'height' of the unquantized cylinder chosen effectively defines the contribution value (K).

One arrangement for producing the image creation system of the invention is shown in FIG. 9. In order to simplify understanding of the operation, the system will be described initially as operating in black and white (monochrome) so that only variation in intensity will be considered. Colour operation is discussed in more detail later.

The touch table 10' is provided as before with its associated stylus and the x and y coordinates fed to address generator 24'. The desired implement is expediently selected by means of the switches 21'.

These switches can take the form of standard digital thumbwheel switches for example, so that setting to a particular number gives an output indicative of the chosen implement and colour (or intensity in the monochrome case) from those available to the user. Examples of typical implement shapes have been illustrated in FIGS. 7 and 8 and these would be pre-stored in ROM store 23' and the selected item made available therefrom on a picture point by picture point basis by means of the address generator 24'. This store 23' effectively gives the value of K for any given picture point within the selected patch. A similar operation occurs also for the intensity value selected from those available within ROM store 22' (see also the schematic illustration of FIG. 10).

The distribution data for the contribution coefficient K for a given implement with values corresponding for example to those shown in FIGS. 7 and 8 read out from the shape ROM 23' will thus vary picture point by picture point in this predetermined manner. In addition intensity data will be read out from ROM 22' for processing by processor 20'. The size of the area of interest for a given implement is expediently passed to the address generator 24' as shown to ensure that the number of picture points processed adjacent a given coordinate is kept to a minimum to ensure maximum processing speed.

The processor 20' not only receives data from ROM 22' but also from frame store 13' which processor uses a portion of the new data with previously stored data, the proportion being determined by the value of K at any given time. The desired (read) addresses from the frame store are accessed by means of the address generator 24' as are the addresses in which the processed data is to be stored. Thus the information not only flows as simulated to the store (as in the prior art case) but flows from the store for processing which may be termed as a "read-modify-write" process. Whilst the picture build up is continuing, the progress is continuously available to monitor 17' by using a three port frame store arrangement as shown which includes a separate display address generator 25' for sequentially addressing the framestore 13' to gain access to the stored data for monitoring. The address generator 25' is shown under the control of sync separator 26' which receives information from a video reference source in normal manner. Thus framestore 13' allows access for processing so as to read and write to every point essentially at random and a video output port that can display the contents of the frame store at video rates.

An example of the arithmetic processing of the data is illustrated in FIG. 10. The pen "shape" distribution and the intensity are shown schematically coming from stores 23' and 22' respectively. There is, of course, no reason why, in the electronic case, the intensity (or in the expanded colour system, the colour) has to be constant across the brush and thus the pen colour or intensity data stored takes on similar proportions to the pen shape data stored.

The algorithm for filling the picture stores 13' contents as the stylus is moved is:

$$LUMA_{(NEW)} = K \cdot P_L + (1 - K) \times LUMA_{OLD}$$
$$= K \cdot (P_L - LUMA_{OLD}) + LUMA_{OLD}$$

where $K \leq 1$ and represents the contribution on a point by point basis of the pen shape.

$P_L$ is the Pen intensity and represents a value of Luminance. LUMA is the picture store content This algorithm is realised by the processor 20'.

The patch of 16×16 pixels is shown to be large enough to encompass the desired pen shape. The processor hardware for handling this particular algorithm comprises a subtractor 30' (e.g. 74S381), a mulipler 31' (e.g. MPY8HuJ/TRW) and an adder 32 (e.g. 74S381). The peak of the pen shape is central of the patch in this instance and will produce the maximum value of K at this point. The x and y coordinate provided by the touch tablet will correspond to the corner of the patch read out from the store and processing of all points within this patch is effected and the modified data written back into the store 13'. During this processing the old luminance value and the designated intensity value are subtracted and the difference multiplied by coefficient K, the value of K being dependent on where the particular picture point lies within the selected patch. The result is added to the earlier luminance data. It is clear that some picture points at the periphery will remain unchanged in this example. Movement of the actual stylus on the touch pad by one picture point will cause a new patch to be read out from the store 13' which will contain most of the earlier picture points but 16 new picture points will be present and naturally 16 others will have been omitted. The processing will again be carried out for the entire patch. During a particular drawing sequence there will usually be no change in the contents of stores 22' and 23', but the patch from frame store 13' will be changing in dependence on the movement of the stylus. It can be seen that during the second processing operation just described, the previous movement by 1 picture point will cause a proportion of the luminance information generated by the earlier processing operation to be used in the calculation of the new content for the updated patch.

The processor 20' is realised in purpose-built hardware to enable the processing speeds to be achieved in a sufficiently short space of time to provide the real time operational requirements which are beyond normal computational speeds.

The number of processing steps for a given coordinate will depend on the size of the patch accessed.

Thus, if the patch was say 32 picture points wide and 32 high there are 32×32 or 1024 points to be processed for each movement of the stylus. A reasonable update rate for the stylus would be 500 times per second or better and this figure results in a processing speed of approximately 2 μsec per point.

The size of the patch or square or pixels removed from the main picture store 13' must be the same size as that accessed from the pen intensity and the pen shape stores 22' and 23'. Thus the latter stores only have a capacity of a few picture points wide and high for any given pen intensity and shape.

The patch size can be made variable dependent on requirements as already described with regard to FIG. 9 and the address generator 24' thereof operates to select the desired location accordingly. An embodiment of this address generator will now be described with reference to FIG. 11.

A system clock generator 50' in conjunction with the normal 'go' pulses resulting from the stylus contact with the touch tablet, control the addressing operation for processing. A 'go' pulse from the touch tablet loads the x and y co-ordinates therefrom into registers 40' and 41'. These values are passed across for loading into the x and y frame store address counters 42', 43' to define the start of the addressing within the given patch. At the same time the two patch store address counters 44' and 45' are cleared (counter 42' being loaded and counter 44' being cleared respectively via OR gate 53'). The 'go' pulse from the touch tablet also initiates the clock generator 50' which produces pulses at a repetition rate sufficiently spaced to allow the processing within the processor 20' of FIG. 9 to be effected before the next pulse is produced (e.g. 500 μS). Thus the first pulse from generator 50' passes to initiate a read operation from frame store 13' and patch stores 22' and 23' at an address defined by the outputs of counters 42', 43' and 44', 45' respectively and schematically represented in FIG. 10. A delay 51' is provided to allow sufficient time for the read operation and the processor 20' to process the data from the first pixel location within the patch with the intensity data and associated contribution value before a write pulse is produced to initiate writing of the processed data back to the frame store 13' so as to effect the 'read-modify-write' sequence. A further delay 52' is provided to allow time for the writing operation to be completed before the clock pulse passes to increment the addresses within the framestore x address counter 42' and the patch address counter 44' for the next cycle.

The x and y size of the patch selected by switches 21' of FIG. 9 is held in the registers 48' and 49' respectively. These values are passed to comparators 46' and 47' respectively so that the current count within counters 44' and 45' can be compared to determine when the desired patch has been fully addressed. Thus after a given number of clock pulses equal to the number of pixels in the x direction for a patch (Nx) when the output from patch address counter 44' becomes equal to that from ROM 48', the output of comparator 46' will change causing patch counter 44' to be cleared and frame store x address counter 42' to be reloaded with the x ordinate from register 40'. At the same time the frame store y address counter 43' and patch store y address counter 45' are incremented so that all the pixels in the x direction in that patch are addressed, processed and rewritten into the frame store for the next y location in the patch. These steps continue until eventually the y address count within counter 45' will become equal to that output from ROM 49' and this will be detected by comparator 47' indicative that all the pixels within the patch have been processed. This equality causes the stopping of clock generator 50'.

When the stylus is moved to the next adjacent x,y coordinate that value will be available at the inputs to registers 40' and 41' and the accompanying go pulse will cause the whole operational cycle to proceed once again, this time for a patch moved by one pixel in either the x or y direction dependent on how the stylus was moved.

By using dedicated hardware for the processing it is possible to read, process and rewrite a patch of 16×16 pixels in only 350 μs approximately which is sufficiently rapid to follow normal stylus movements without falling behind in the processing.

Thus due to the speed of processing, the system will respond seemingly instantaneously for all brushes or other artists implements up to the larger. For very large brushes a patch of 16×16 or even of 32×32 is too small and either larger patches or multiple writing has to be considered and this causes a slowing of the action. However, the larger the brush the slower the action is not dissimilar to working with a real life brush and is, therefore, quite acceptable. In order that this slowing up of the brush does not happen in unnatural steps the size of the patch is made only as large as is necessary for the brush being used and will track the change in size as required.

Although the picture point data is shown in store 13' of FIG. 10 as being defined to 8 bit resolution, in practice increasing the resolution to up to 16 bits will result in a picture of higher quality being obtained if this refinement is required. The bit handling capacity of the stores and processing will accordingly require expansion.

Although the resolution of the raster display is only 512×768 pixels, for instance, to enhance quality, the pen position (x and y) is preferably known to say an accuracy of 8 times this value (i.e. to ⅛th of a pixel in each direction). The cylinder shape described above for example can in practice be placed upon the pixel matrix to an accuracy of ⅛th pixel as the touch tablet is inherently capable of defining this stylus coordinates to such accuracy. Thus 64 (i.e. 8×8) placements of the cylinder each resulting in a different brush shape can be stored in store 23' and the appropriate one used dependent on the fractional parts of the coordinate given by the touch tablet and therefor results in an effective brush position accuracy of 8 times better than the original pixel matrix. The patch store capacity and that of the address generator will require adjustment accordingly.

The brushes and pencils described so far have no temporal nature, if the stylus is held steady over a point, nothing additional happens with time. However, in the case of the airbrush the longer it is held over a point the greater the build up of paint. This modification can simply be applied to the algorithm of FIG. 10 by choosing a touch tablet/stylus combination which produces a pulse train whilst held at a given coordinate location (rather than the single 'go' pulse as discussed above). This allows the train of go pulses to each initiate the 'ready-modify-write' operation described in relation to FIG. 11.

The system can be made to simulate even more realistically by adding the dimension of 'pressure'. The texture of the artists tool changes with pressure and thus if a pressure sensitive device were fitted to the point of the stylus then this could be taken into account when setting the pen shape stores. Alternatively, a second multiplier can be added to the standard algorithm between the pen shape store and the processor as now shown in FIG. 12 with additional multiplier 33'. The stylus 11' is shown schematically with an integral spring loaded potentiometer 58' which includes a wiper contact which will produce a voltage Vp dependent on the tip pressure. This voltage is converted via ADC 59' to the value $k_1$. Thus if little pressure is being used coefficient $k_1$ is small and if high pressure is employed, $k_1$ tends to 1.

A further refinement of the machine is to simulate the action of a light rubber or, in the water colour case, clear water by allowing a blurring facility. This can be achieved by modifying the processor of FIG. 10 to operate as an accumulator to allow recursive low pass filtering on the patch as shown in FIG. 13. This allows a contribution from adjacent picture points within the patch to be provided when calculating the intensity of a particular picture point.

The processor 20' includes subtractor 30', multiplier 31' and adder 32' as before. The old data is received by subtractor 30' where delayed data from delay 34' is subtracted therefrom. The result is multiplied by coefficient C in multiplier 31'. The output from the multiplier is added in adder 32' to the delayed data from delay 34'. The hardware of this processor acts as the desired accumulator with the value of C determining the degree of smearing. If the delay period $\tau$ is selected to equal 1 picture point then horizontal smearing takes place. If $\tau$ equals 16 picture points then vertical smearing takes place. This delay can be selected using thumbwheel switches for example. As shown the value of C can, if desired, be variable in regard to both the shape of the rubber say (made available from store 23') and the pressure of application of the rubber (made available from stylus 11') by using the further multiplier 33'.

Although the distribution of FIGS. 7 and 8 are somewhat symetrical, with other configurations this need not be so. Thus for a stipple brush for example, a number of peaks will be present.

Although the system has been described for ease of explanation as achieving a monochrome operation, in practice the system would adapt to generate colour images. A first step would be to provide a 'partial colour' system using memories along the lines of FIG. 5. In such a situation the processing requirement is shown in FIG. 14. The intensity values used from store 22' are now defined as colour values and processed values derived therefrom will be converted into actual colour values on read out from the frame store (as in FIG. 5).

There is of course, no reason why, in the electronic case, the colour has to be constant across the brush and thus the pen colour store can take on similar proportions to the pen shape store.

Thus, the algorithm for filling the picture store contents as the stylus is moved is now:

$$VALUE_{new} = K \cdot P_c + (1-K) \times VALUE_{old}$$

Where
$K < 1$ and represents the contribution on a point by point basis of the pen shape.
$P_c$ is the Pen colour and represents a value of Hue, Saturation and Luminance.
VALUE is the picture store content for that particular picture point.

With a partial colour system, difficulties can arise since 'intensity' produced by the algorithm may appear as 'colour' incorrectly. Special luminance values must be 'reserved' to avoid this degradation.

In order to provide a full range of hues, saturations and luminance levels however a system with three frame stores and associated processing would be preferable as shown in FIG. 15. These would handle the luminance and colour difference (i.e. Y, I and Q) components respectively.

Thus three frame stores 13A'-13C' are shown with associated processors 20A'-20C', for the respectively Y, I and Q components.

The processed data held in the various frame stores is passed to combiner 35' where the luminance and colour difference information is combined to provide full colour video for the monitor 17'. The read and write addressing respectively of the frame stores will be common to each store and is supplied by address generator 24' as before. The patch store addressing will be common to the patch stores 22A'-22C' and 23'. As now shown in FIG. 15 where there is a number of selections for the various parameters it is convenient (as an alternative) to replace the switches 21' of FIG. 9 with the computer 12'. Thus a given colour or implement for example can be selected on the computer keyboard 37'. By using RAMs instead of ROMs for the patch stores 22', 23' allows a greater number of variations to be conveniently dealt with, as any one of a number of colours or shapes stored in bulk computer store 38' can on operating the keyboard 37' be loaded via computer 12' into the designated RAM. Thereafter the stores 22', 23' are effectively used as a ROM until a new colour or shape is selected, at which time the RAMs are written into with updated parameters. The storage capacities of the stores 22', 23' need only be equivalent to the maximum brush size required (defined to pixel or sub-pixel accuracy). The patch size and x,y coordinates can also be passed via the computer. Time information from the touch tablet and pressure information from the stylus for example can also be passed conveniently via computer 12' to the processors 20A'-20C' as represented by the broken lines.

As the computer is only being used for switching and routing operations as an operational alternative to the thumbwheel switch configuration described earlier and not for processing, its speed limitation is not a problem in the present system.

As shown a cursor display block 39' may be included to indicate, on the monitor 17', the position of the stylus. The cursor block may include an offset device controlled by the patch size information available via the computer so that the cursor is offset to indicate the centre rather than the corner of the patch.

The system described is not restricted to use in the broadcasting art alone. After completion of the creation process the image may be converted into hard copy for example using the photoplotter 36' so that it can be used as normal artwork for magazines and so on.

With the addition of other peripherals (e.g. modem) the image could be directly relayed to remote locations or recorded onto disk for transportation to a remote location or for future use.

Thus a full range of options are open to the operator and are shown as inputs to computer 12' and include colour selection, implement and medium, pressure, time of application (for airbrush etc) and blurring of the eraser or water colour simulation. It has been found that the system produces extemely good artistic results.

Although the system has been described as using a touch tablet, other possibilities exist for generating the x and y coordinates.

The algorithms described above may alternatively be generated by a rapidly operating dedicated microprocessor, although this may result in some loss of computational speed.

Although the FIG. 15 arrangement has been described generally in terms of NTSC colour components, it can equally apply to PAL colour components or RGB.

The object of the invention is to produce a video image creation system which will produce realistic images in approximately real time more advantageously and preferably also without the use of a random access frame store.

SUMMARY OF THE INVENTION

According to the present invention there is provided a video image creation system comprising operator controlled means for designating points in a line to be produced on an image, means responsive to said operator controlled means for generating a patch of signals representing the video effect of successive overlapping brush stamps along said line,
a store for video signals representing the image, means
for sequentially reading video signals from said store,
and means for updating the signals in said store once per reading cycle thereof in response to video effect signals generated during a preceding cycle period.

Further according to the present invention there is provided a video image creation system comprising operator controlled means for designating points on an image to be created,
means for generating brush stamp signals for controlling the video effect of signals to be used in the image,
means for multiplying factors related to successive brush stamp signals for a point to generate a signal representing the effect of overlapping brush stamps,
means for storing color video signals representing an image, said store means being updated at intervals, and means for updating the signals in said store at intervals in response to the said generated signal.

BRIEF DESCRIPTION OF THE DRAWINGS

One embodiment of the present invention will now be described with reference to the accompanying drawings:

FIG. 7 shows an prior art example of contribution from a pencil;

FIG. 8 shows another example from a more pointed pencil;

DESCRIPTION OF PREFERRED EMBODIMENTS

The invention takes advantage of memory chips that can be assembled to produce a store which is continuously recycled to introduce a one frame delay. In the example of the prior art system described herein the frame store was composed of random access memory chips so that the image signals processing could be carried out as required in response to the operators input.

Figure 2:
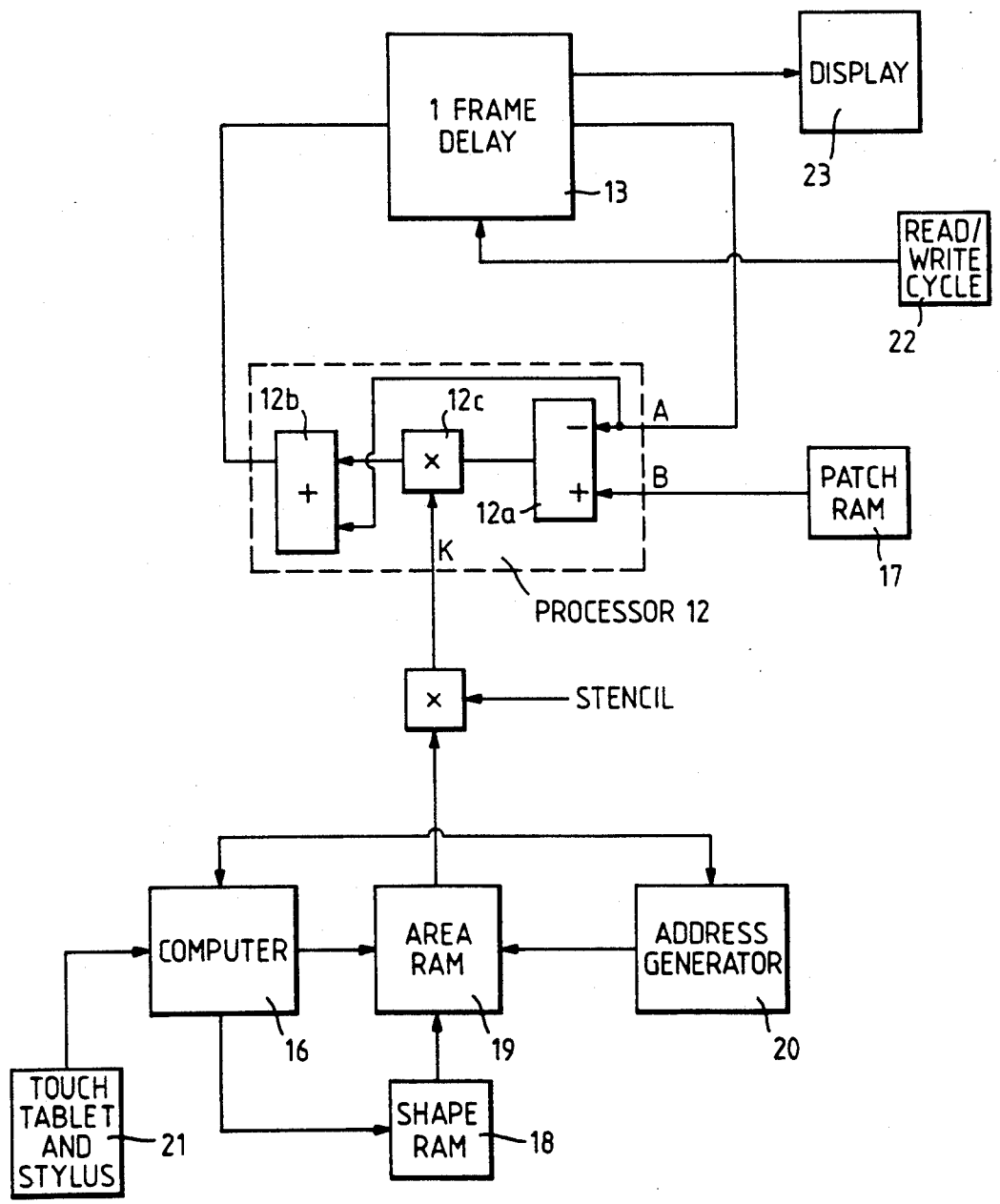
FIG. 2 shows one example of an embodiment of this invention.

As in the prior art system the system in FIG. 2 receives signals from the touch tablet/stylus combination giving co-ordinates of points on the touch tablet along a line drawn by the operator. The brush shape, size, the paint color etc. are also available to be chosen by the operator in the same manner as in the prior art system.

Figure 4:
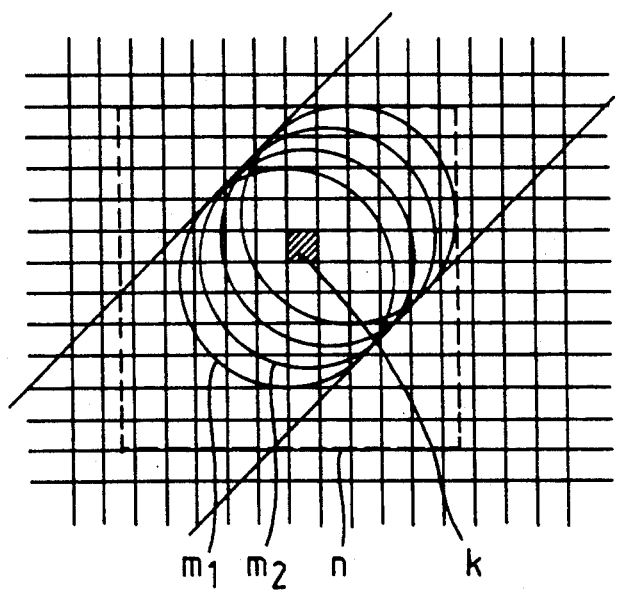
FIG. 4 is a pictorial representation of the operation of the embodiment.
Figure 5:
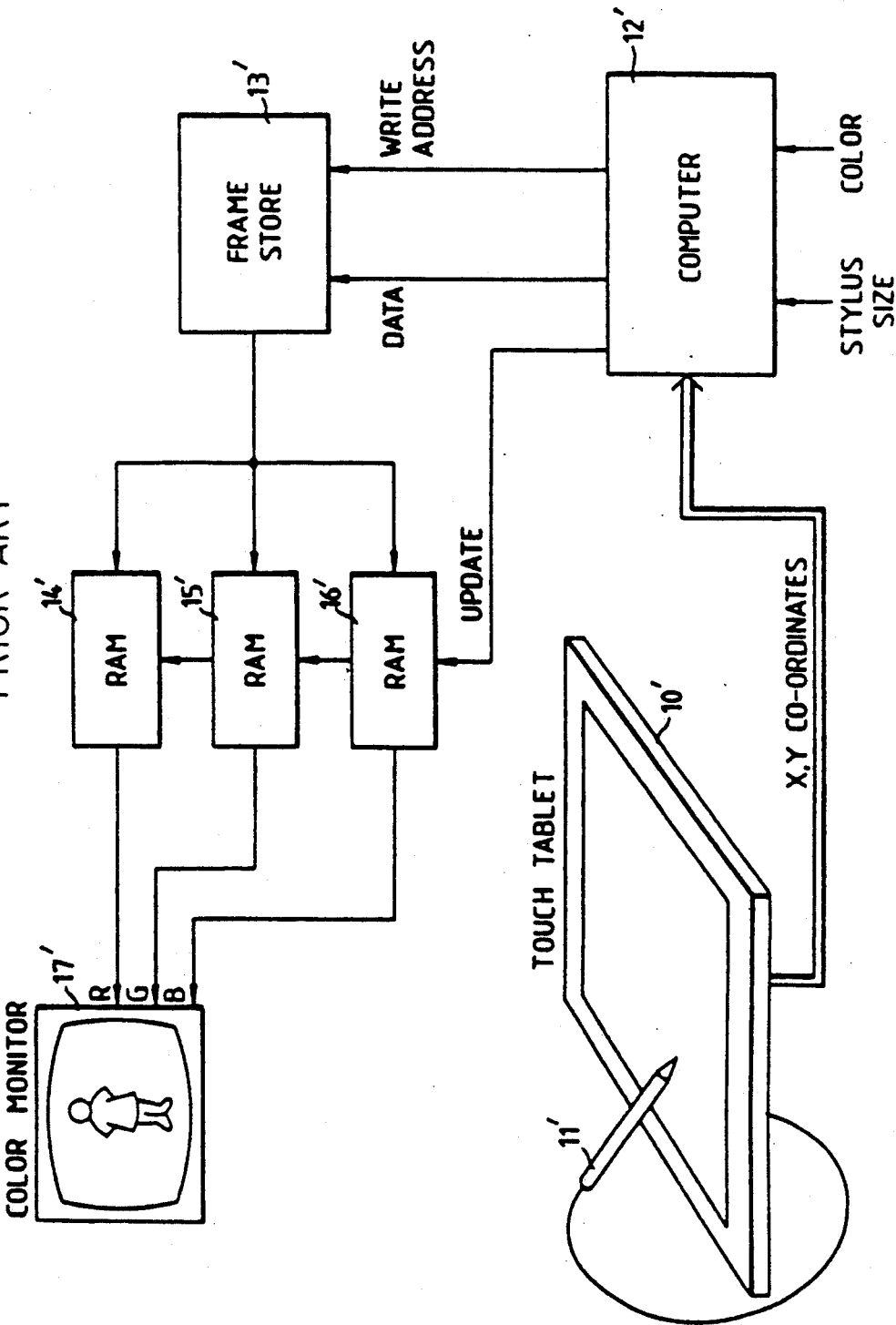
FIG. 5 shows a known picture creation system.
Figure 6A:
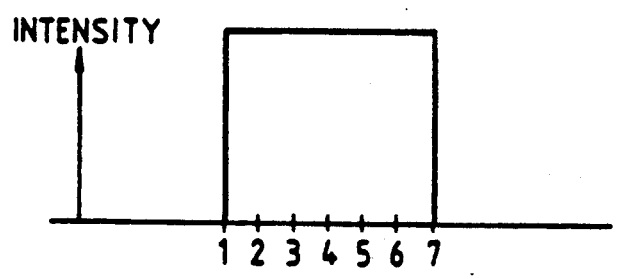
FIG. 6 shows a graphical comparison between the intensity in prior art arrangements.
Figure 6B:
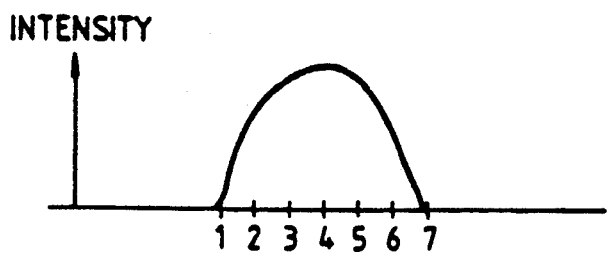
Figure 9:
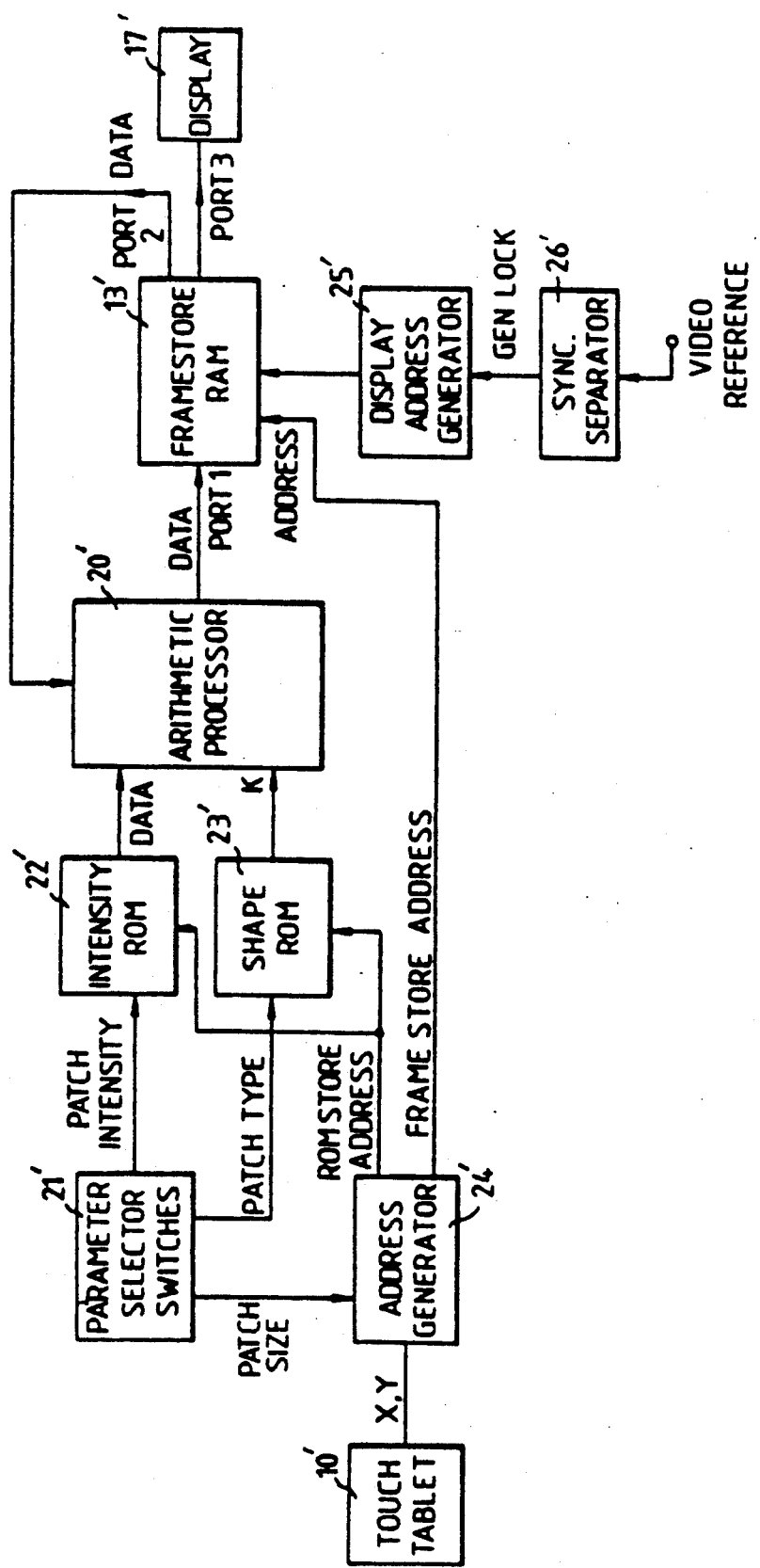
FIG. 9 shows one embodiment of the prior art system.
Figure 10:
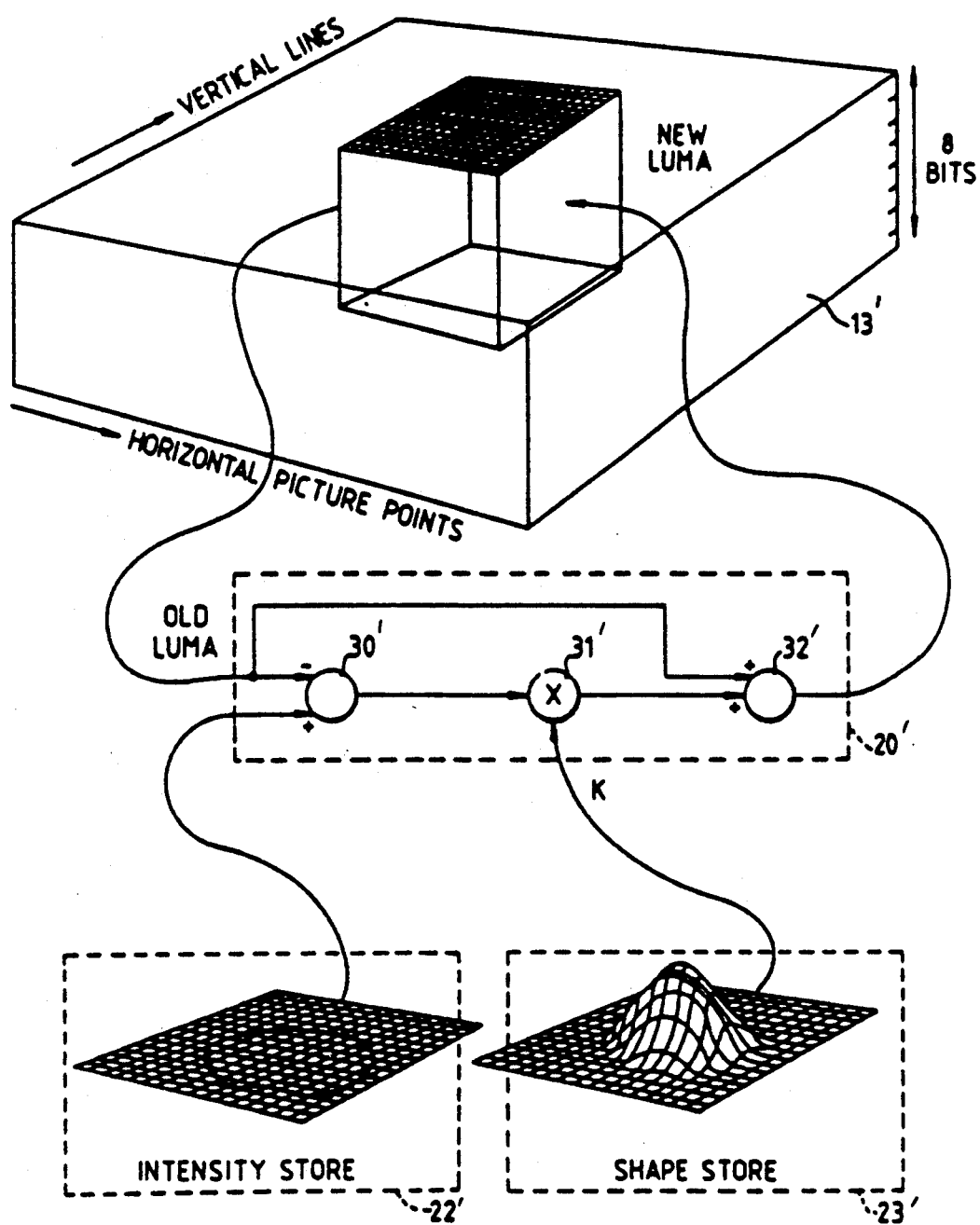
FIG. 10 shows an example of the operation of the prior art processor of FIG. 9.
Figure 11:
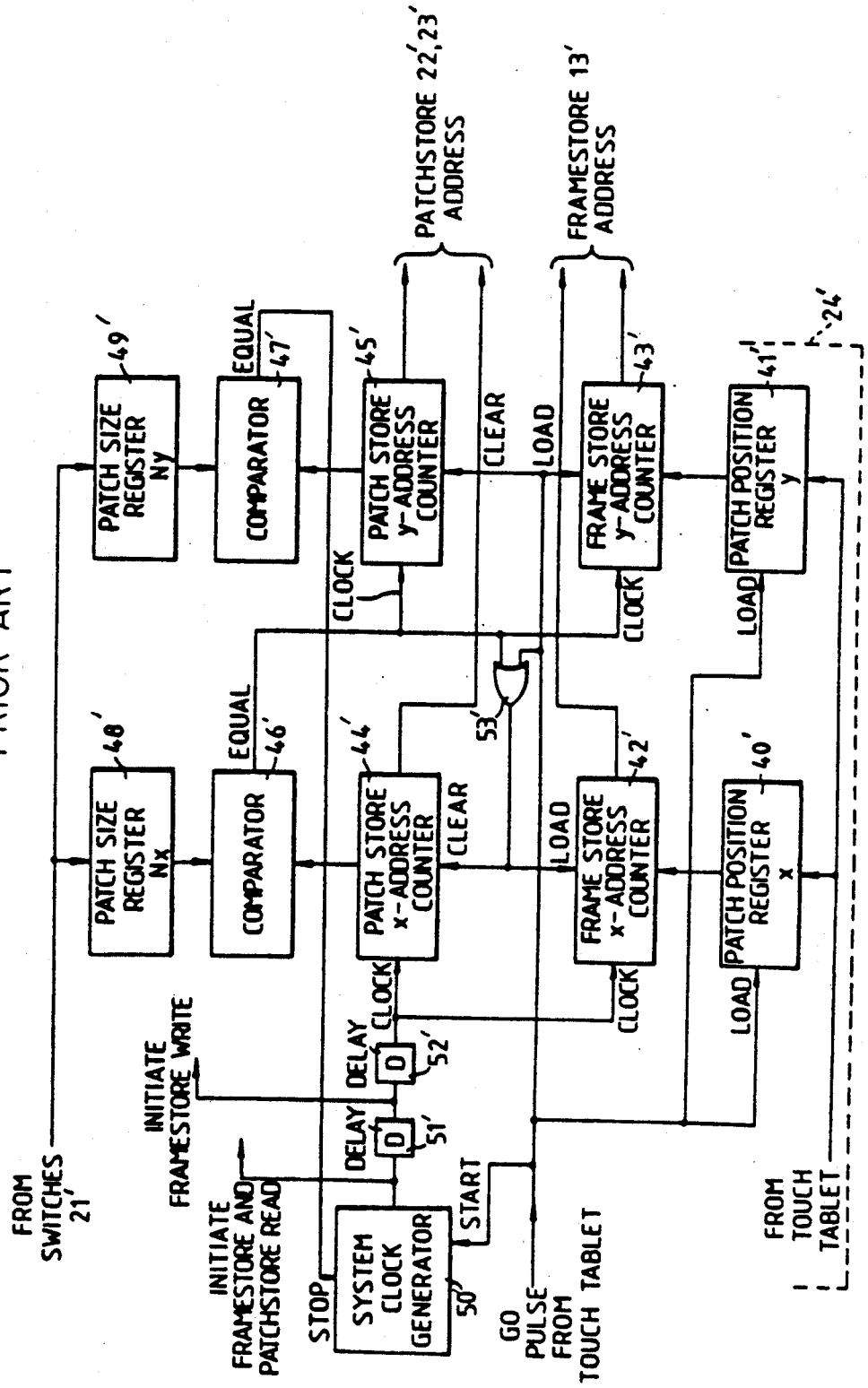
FIG. 11 shows the prior art store addressing operation in more detail.
Figure 12:
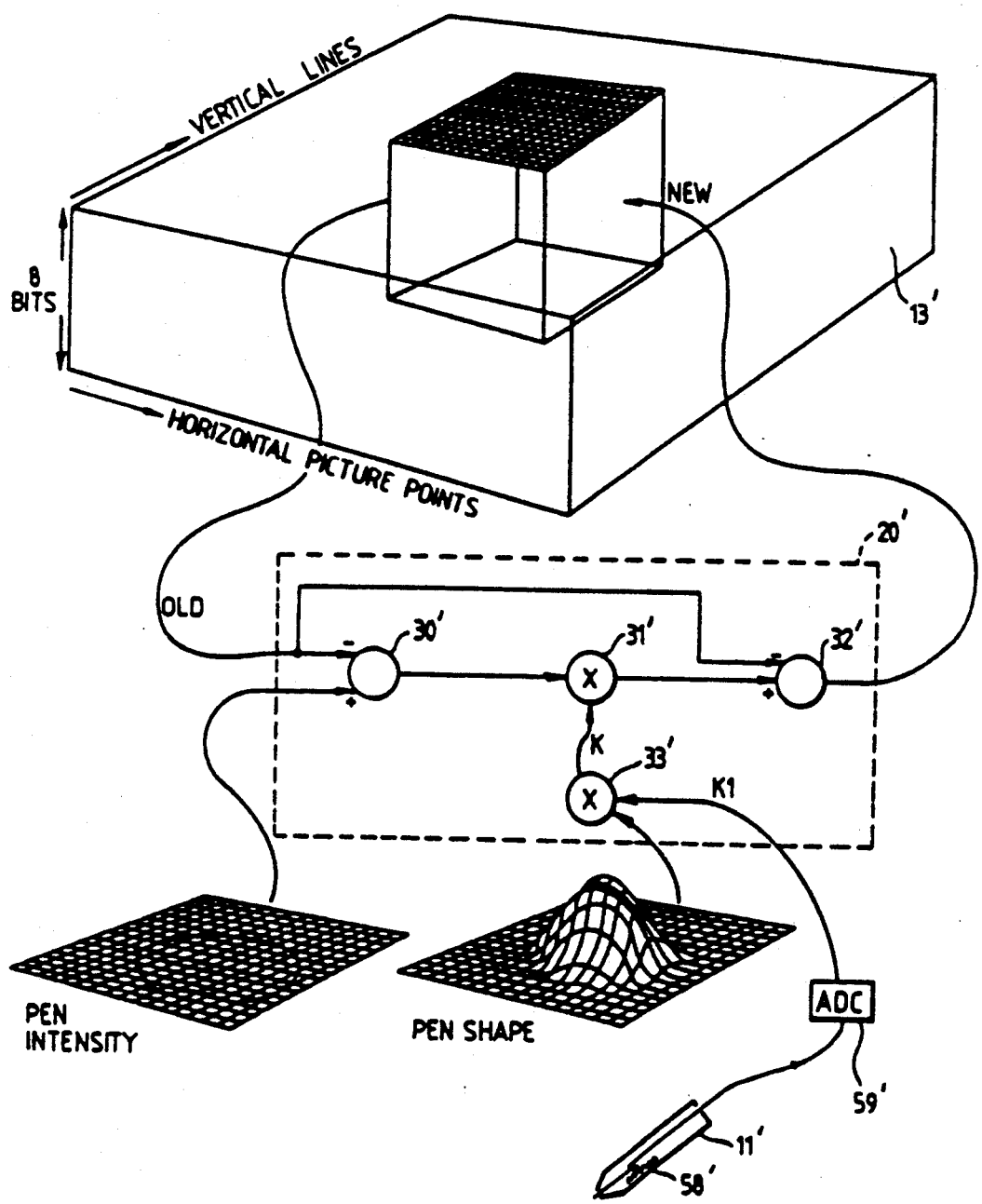
FIG. 12 shows an alternative prior art processing operation to that of FIG. 10.
Figure 13:
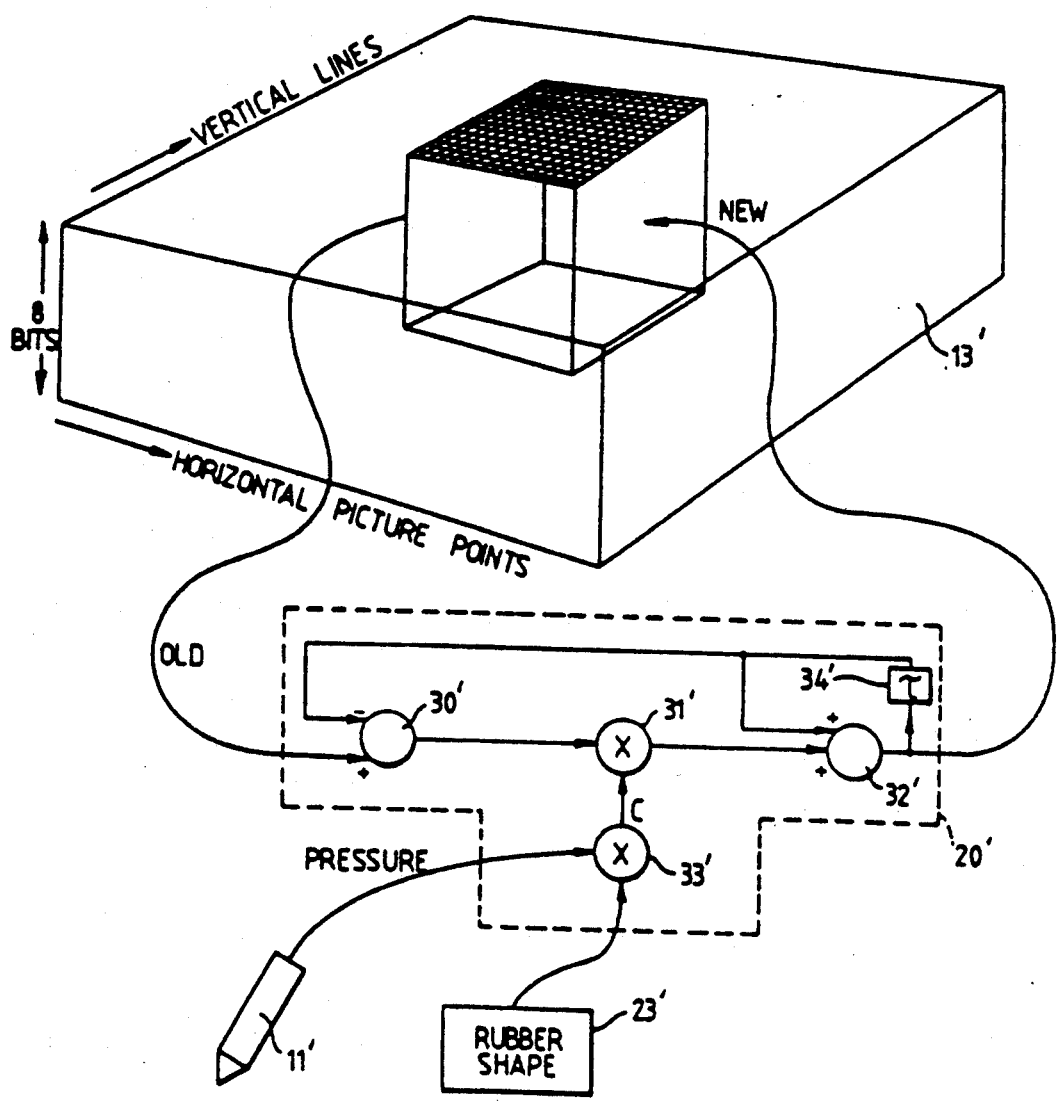
FIG. 13 shows a further alternative prior art processing function.
Figure 14:
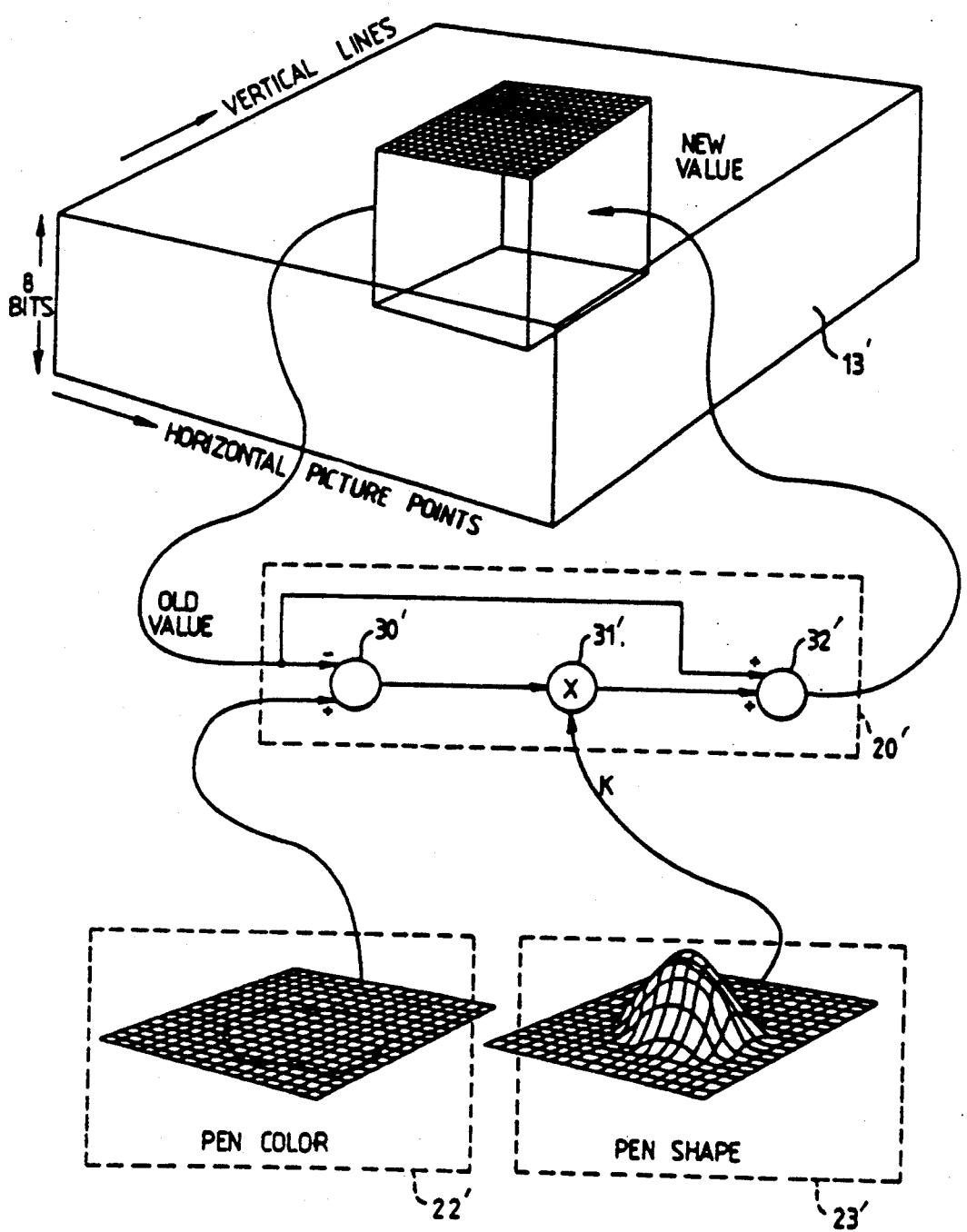
FIG. 14 shows a prior art configuration employed for a partial colour system.
Figure 15:
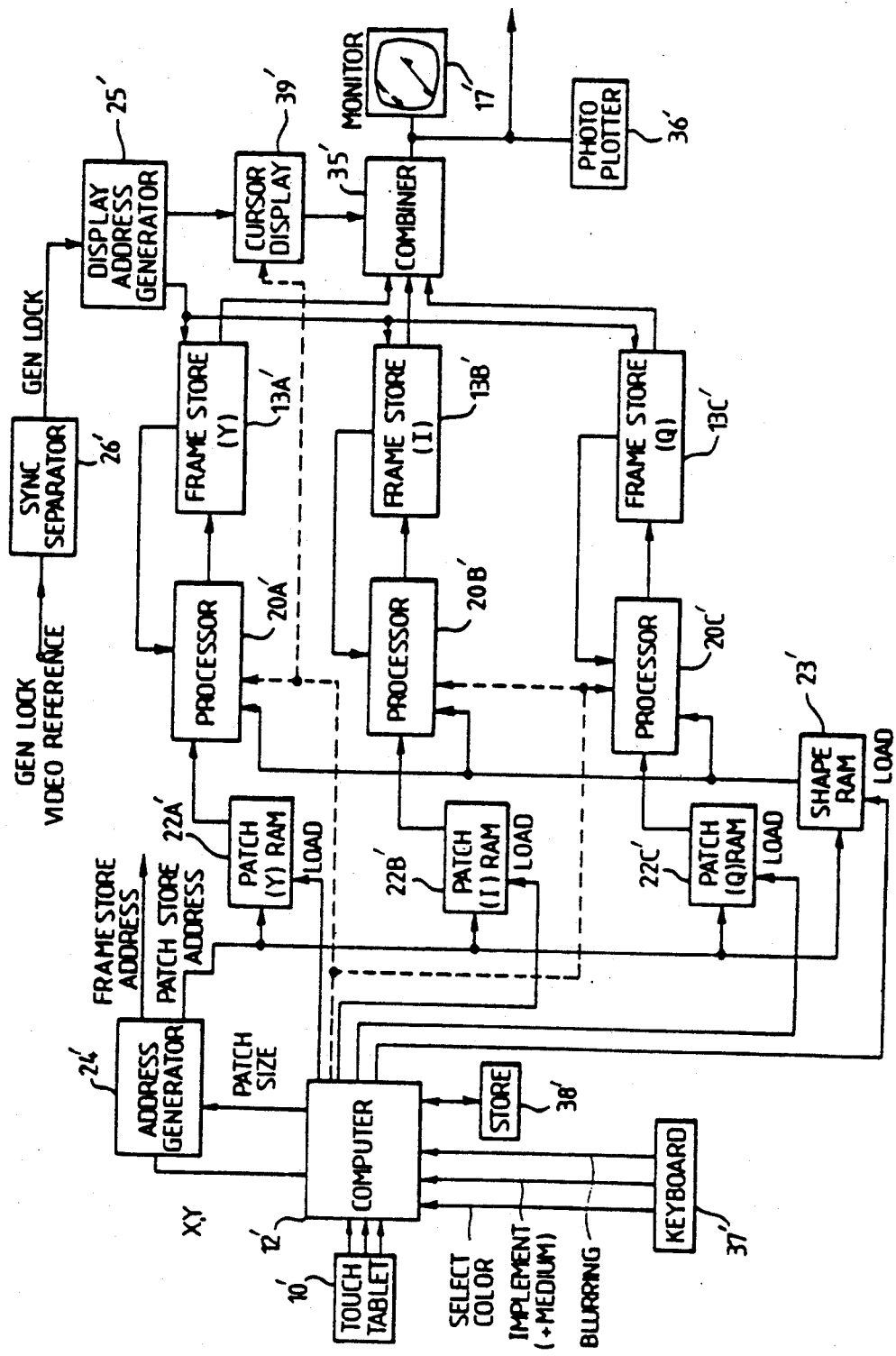
FIG. 15 shows an expanded prior art arrangement capable of providing full colour processing.

FIG. 4 is a pictorial representation of the effect of several brush stamps in a particular stroke. Each small square such as k represents a picture point in the picture being produced, and the circles $m_1$, $m_2$ . . . represent successive brush stamps, each brush stamp enclosing a group of picture points. The shape RAM 18 (which corresponds to 4) holds signals representing the distribution of color effected by the selected brush to each picture point 'covered' by the brush at any one position of the brush. These signals remain unchanged for as long as any particular implement is selected and in general the signals define the distribution of the brush to a rectangle of picture points such as indicated by the dotted outline n. For picture points in the rectangle which are outside the stamp of the brush, the distribution signals would be zero. Within the stamp, the distribution signals may vary to represent the brush shape as explained in said U.K. Patent Publication and in the descriptions and drawings thereof that are set out in this specification. As the artist moves the stylus, the position of the brush stamp will change and for each of a succession of positions of the stamps, the signals from the shape RAM 18 are read and are processed as will be explained later. In general successive brush stamps overlap when a stroke is made, and as can be seen in FIG. 4 in the case of picture point k, for example the distribution signal for different points in the brush stamps $m_1$, $m_2$ . . . should be used for processing of the same point in the picture. In practice, the number of brush stamps affecting any one point in the picture, when making a single stroke, can be high, as much as ten or more depending on the speed with which the artist makes the stroke.

Figure 1:
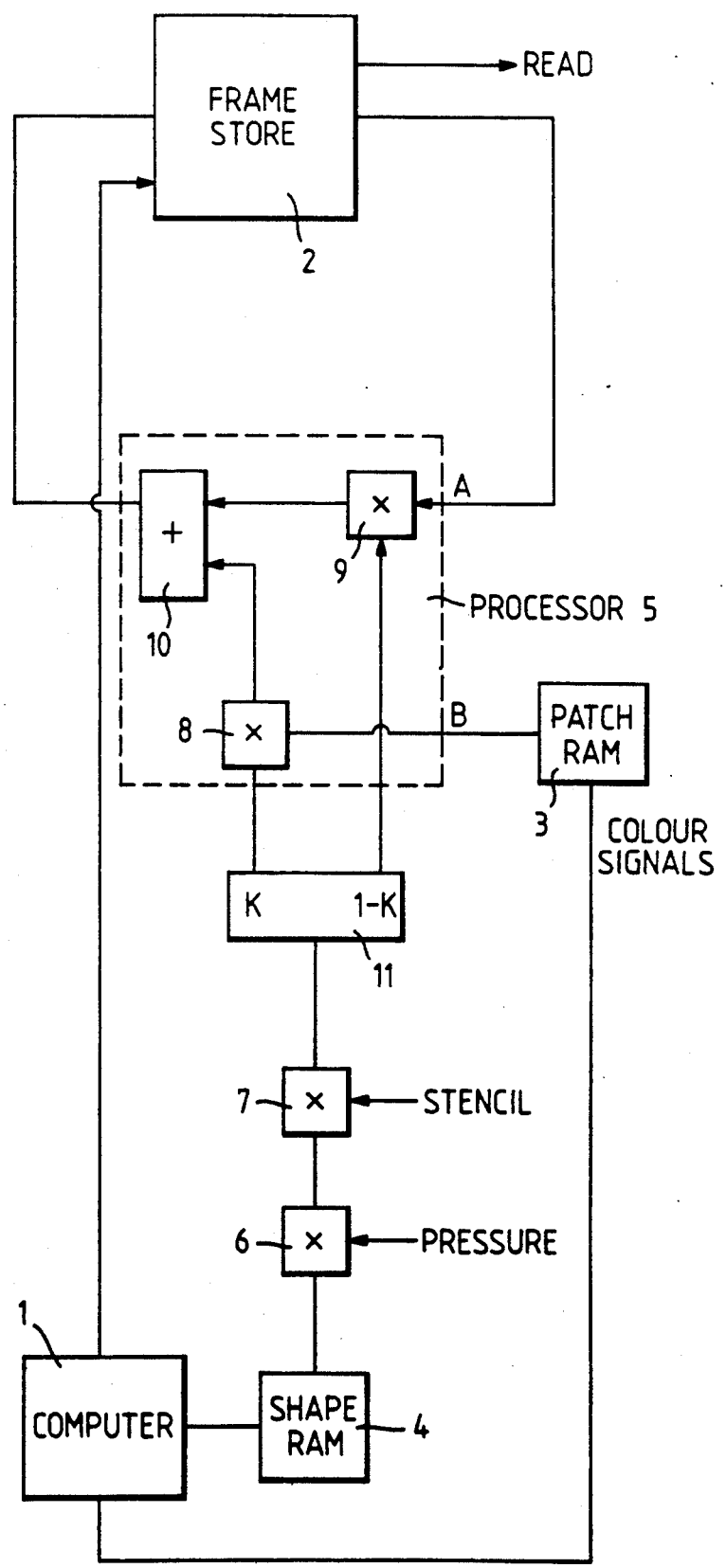
FIG. 1 shows an example of a prior art system.

When signals are received by the computer 16 from the touch tablet and keyboard, the computer produces the addresses in a patch, and loads the selected color video signal components into patch RAM 17 and the distribution signals into shape RAM 18. Up to this point the system works in the same manner as the prior art apparatus, but at this point the distribution signals are not immediately used to control the processing of the color signals from 17 with the stored signals from the frame store. Instead the distribution signals are processed in a manner described later and held in an another store 19 called the area RAM until the appropriate time in the respective cycle of frame store 13, which in this case is a cyclic frame delay store instead of a RAM. The size of the store 19 is such that it can store a distribution signal for each picture point which is contained within that portion of a stroke that can be drawn in a frame time. This size can be calculated. When the operator draws a line on the touch tablet the computer identifies the co-ordinates of the points along that section of a line drawn in any particular frame period. The distribution signals from shape RAM 18 for each picture point enclosed within successive brush stamps along the line are processed to produce a new set of distribution signals for the picture points enclosed within the respective portion of the stroke. This processing is carried out under control of the computer 16 and takes into account the pressure factor from the stylus; the pressure multiplier (such as 6 in FIG. 1) is omitted for convenience in FIG. 2, but would normally be located between 18 and 19. Other factors such as dwell time of the stylus over a particular point can also be taken into account. The result of processing of the distribution signals is that at the end of a frame period the signals in area RAM 19 will represent the video effect of each point of the stroke, as if drawn using white paint on a black background. The distribution signals are used as control signals to control the signals from the patch RAM 17 and also as applicable, the signals from the frame delay 13. It should be clear that the signals from the area RAM 19 may relate to a succession of brush stamps which would normally overlap each other, as described from a brush stamp which shows only the distribution for one brush position.

The computer 16 not only produces addresses in successive patches, but produces via address generator 20 and holds the co-ordinates of successive points relative to the frame delay store 13 within the length of line drawn in one cycle period of the store 13. These co-ordinates are translated into stamp addresses in the area RAM 19, for successive picture points enclosed within brush stamps along the line, assuming that the area represented by the RAM 19 is positioned relative to the image frame to contain the length of stroke along the line drawn on the touch tablet. The computer also generates in 20 and holds a reference address, in terms of the frame delay store 13, for the area in area RAM 19, usually the address of the top left hand corner of the area when positioned as aforesaid. The stamp addresses are used to read distribution signals for successive brush stamps from the shape RAM 18 and apply them to the area RAM 19, one set of such signals being applied for each brush stamp along a length of line.

The reference address is compared with the successive addresses accessed during a read/write cycle of the store 13. When identity is detected, the computer initiates an addressing cycle of the address generator 20 to read the signals from the area RAM 19 to the processor 12, which comprises a subtractor 12A, adder 12B and multiplier 12C arranged as shown. This processor is equivalent to processor 5 in FIG. 1. The addressing cycle of 20 is such that each signal in the area RAM 19 is read in synchronism with the signal read from the corresponding picture point in the store 13, by the read/write cycle generator 22, with the area represented by the RAM 19 positioned as aforesaid. The signal read from the RAM 19 is the signal K which is used in the processor 12 for the signals A and B as described in relation to FIG. 1.

It will be understood that the procedure described is repeated for every stroke, or length of stroke, drawn within successive cycle periods of the frame delay store 13. It will be appreciated that for any picture point signal read from the store 13, at a time when K is zero, the signal will be rewritten in the store 13 without change, i.e. it is merely refreshed. An existing signal B is modified only if the operator has made a new stroke over the respective picture point. Nevertheless the updating is performed during the normal read/write cycles of the store 13. The patch store 17 for the selected color in the case of FIG. 2 has to provide the appropriate signals for all picture points in the area represented by the RAM 17. A register, from which the same color signals can be read repeatedly in time with the addressing, effected by the adder generator 20 could be used instead of the RAM. The access to area RAM 19 is of sufficient speed to enable the new picture point signals to be produced from processor 12 at the correct timing for the refresh cycle. When a set of processed distribution signals from the area RAM 19 is being used in the processor 12, any picture point addresses which may be generated by the operator using the stylus during that interval are held in the computer until the processing in the processor 12 is completed for the respective frame (or field) period. The whole frame period other than such intervals is however available for processing the distribution signals and writing them in the area RAM 19. Starting from any such interval, the address in the store for the corner of the next area stored in area RAM 19 is produced in address generator 20 and at the next cycle time the further set of newly processed distribution signals is used in the processor 12. So the system described here receives signals indicative of a stroke to appear on the image and taking one section of that stroke, processes the brush stamps for this section before adding the new information as the store 13 is cycled.

In the system shown in FIG. 2 the processing selected for the distribution signals is relatively simple. Each point in a line designated on the touch tablet has distribution signals for the patch of picture points including ones adjacent to it and the distribution signals for successive points are combined to produce a distribution signal for a section of the stroke to be drawn where the respective patches of distribution signals (brush stamps) overlap. In the prior art system the processing was such that each patch was individually processed so that new video signals were stored in the , frame store patch by patch. When the next patch was processed then for points which overlapped the new video signal included a component produced by multiplying the stored video signal by the distribution signal so this new signal would be related to the two distribution signals. In the system illustrated in FIG. 2, it has been found to be sufficient to process the distribution signals accumulated in the store 19 simply by adding the distribution signals for overlapping picture points in successive brush stamps, such addition being achieved under the control of the computer 16. The system is scaled so that the maximum video effect signal, which results for the addition of the distribution signals for the maximum number of picture points which may overlap, is normalised to unity. In a simple case this may be done by dividing the sum by the maximum number of picture points. If desired the video effect signals accumulated in the store 19 can be non linearly modified, for example with the aid of a look up table, so that the signal is 'compressed' as a function of its magnitude before normalisation to unity. This will produce an effect of processing closer to that produced by the prior art processing system.

Figure 3:
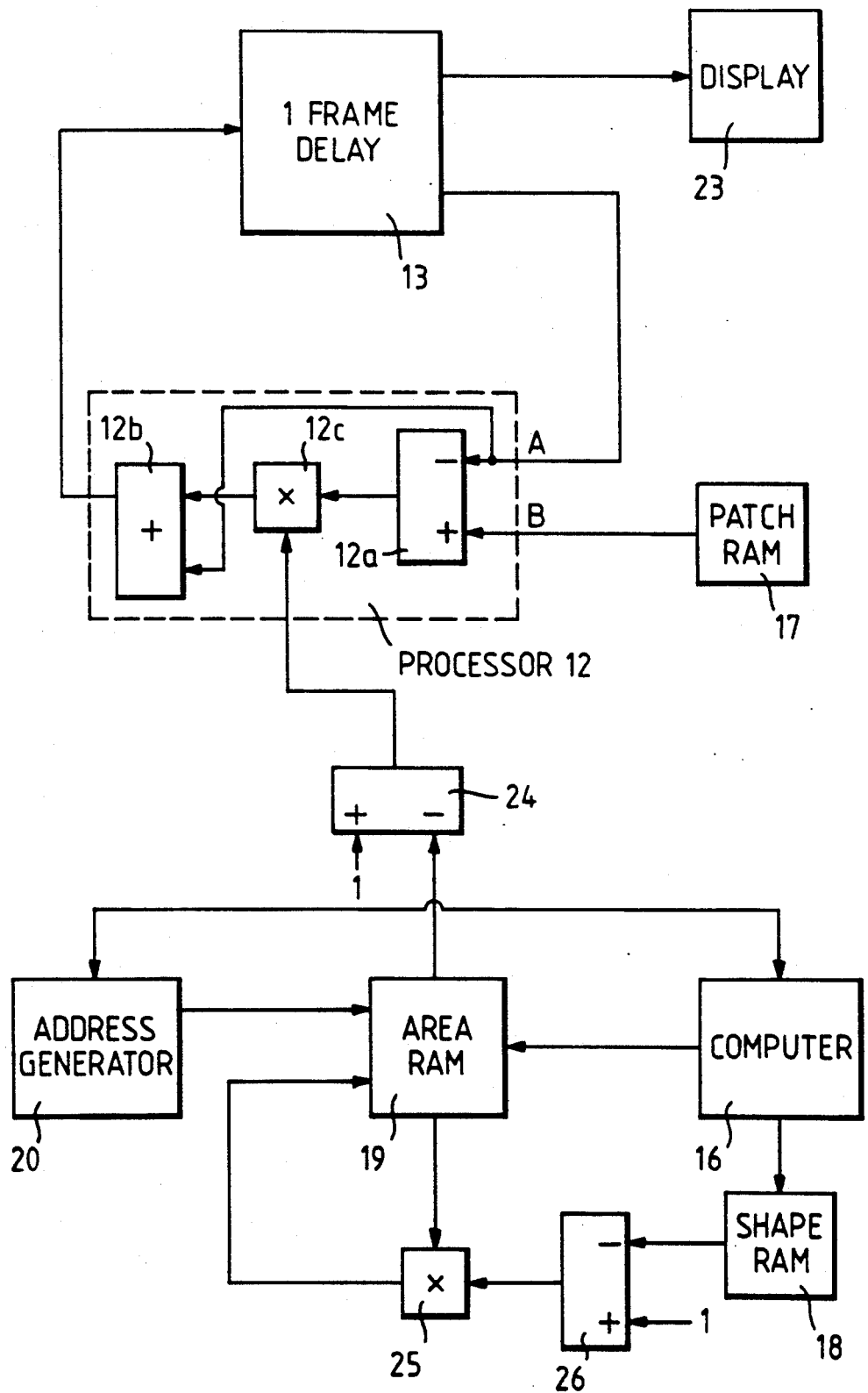
FIG. 3 shows a second example of an embodiment of this invention.

A second way of processing the distribution signals to produce the video effect signals is shown in FIG. 3. To understand this processing it is necessary to consider the processing of the picture point signals which occurs in the system of said U.K. Patent Publication the descriptions and drawings of which are set out in this specification. The processor for this system produces an output signal for each picture point which is a blend of the color signal A stored in the frame store 2 for that point and the incoming color signal B for the same point from a patch RAM 3. The signal which is output from the processor and written into the frame store to replace the signal A is $(1-K)A + KB$ where K is the distribution signal.

If we consider a picture point in a first brush stamp then the output $A_1 = (1-K_o) A_o + K_o B_o$, where the suffixes 0 refer to the first brush stamp and the suffix 1 refers to the resultant signals stored in the frame store. When the next brush stamp overlaps this point with a value $K_1$ for the distribution then:

$$A_2 = (1-K_1) A_1 + K_1 B_1$$

but if it is assumed that the color is the same over a stroke, which need not be the case, $B_1 = B_o$ and substituting for $A_1$:

$$A_2 = (1-K_1)((1-K_o) A_o + K_o B_o) + K_1 B_0$$

if the substitutions $K' = 1 - K$ is now made:

$$A_2 = K'_1 K_o' A_o + (1 - K'_1 K_o') B_o$$

It will be obvious that for the nth overlapping brush stamp at the point under consideration:

$$A_{n+1} = (K'_n \ldots K'_o) A_o + (1 - K'_n \ldots K'_o) B_o$$

This equation represents the value of the video signal stored in the frame store 2 at a particular picture point which has been updated in response to each of $m+1$ overlapping brush stamps. In the FIG. 3 embodiment, the same result is produced with only one updating of the respective picture point in the frame store 13, this result being predicated upon combining the brush stamp signals, prior to updating the frame store 13, to produce combined distribution signals representing the combined effect at respective image points of successive overlapping patches of brush stamp signals. So if the combined brush stamp signals are processed by the computer to produce $(K'_n \ldots K'_o)$ then by using $(1 - (K'_n \ldots K'_o))$ in the processor 12 as in FIG. 2 the same result as in the prior art illustrated in FIG. 1 and in U.K. patent Application No. 8136539, which corresponds to U.S. Pat. No. 4,514,818 can be achieved. This processing can be achieved using fairly simple circuits such as the components 24-26, shown in FIG. 3. When the brush stamp signals have been loaded into shape RAM 18 the first value for K for a picture point is input to subtractor 26 which produces $K_o' = 1 - K_o$ and this is stored in area RAM 19. When the next value for K for that point is accessed for an overlapping brush stamp this is converted to $K_1$ and forms one input to multiplier 25, the second input being $K_o'$ from area RAM 19. The resultant $K_1' K_o'$ is then written into RAM 19. When all the brush stamps for that section of the stroke drawn in the frame period have been processed each point in the stroke will have a value for $K_n' \ldots K_o'$ stored in area RAM 19. In this case before being applied to processor 12 the values for each point from area RAM 19 are passed through subtractor 24 to produced $K = (1 - K_n' \ldots K_o')$ In practice the systems illustrated would include three paths for three video components, for example, Y,I,Q or R,G,B. The timing of the system is such that the operator will be able to view the image as it is being created and for this purpose the contents of the store 13 are read to a color T.V. monitor, e.g., display 23. The signals in store 13 can be committed to a long term store when the operator is satisfied with the picture created.

In an alternative form of the invention, the updating of the video signals in the frame delay store 13 is not carried out on reading respective video signals in the area represented by the RAM 17 during the normal read and write cycle. The updating is carried out during the field blanking intervals when video signals are not normally read from the store. To achieve the updating in the limited time available during blanking intervals it is necessary to have random access to those locations in the store at which video signals are to be found corresponding to the picture points in the area RAM 19. Therefore in this case, the RAM 13 is required to be a random access store; nevertheless, this form of the invention still achieves significant advantages in handling the video signals, since the number of addresses in the frame store 13 which have to be accessed in each cycle is substantially reduced compared with the system illustrated in FIG. 1 where the number of addresses to be accessed is the product of the number of brush stamps in a cycle by the number of picture points per patch.

It will be appreciated that some of the signals derived by the computer 16 to represent co-ordinates or points on a line drawn by the operator on the touch tablet, may in fact be produced by interpolating between signals representing points actually designated by the touch tablet/stylus combination.

I claim:
1. A video image creation system comprising:
operator controlled means for designating points on a line to be produced in an image;
means for generating signals representing video effects of one or more selected brush stamps on the image;
means responsive to said operator controlled means and said signals representing the video effects of one or more selected brush stamps on the image for generating combined signals representing the video effects of successive overlapping brush stamps along said line;

input means for providing a color video signal;

a store for storing picture point video signal representing picture points of said image;

means for cyclically reading said stored picture point video signals from said store in successive reading cycle periods; and means for updating said picture point video signals in said store once per reading cycle period, said updating means including means responsive to said combined signals generated during a preceding cycle period and responsive to said color video signal provided by said input means to update said picture point video signals in the store during a current reading cycle period.

2. A video image creation system as in claim 1 wherein said operator controlled means comprises a touch tablet and a stylus and said signals generating means includes means for altering the generation of said signals representing the video effects of one or more selected brush stamps on the image in dependence on the pressure on the stylus.

3. A video image creation system as in claim 1 wherein said operator controlled means comprises a touch tablet and a stylus for engaging the tablet and said signals generating means includes means for varying the generation of the signals representing the video effects of one or more selected brush stamps on the image in dependence on the duration of a time period during which the stylus engages the tablet.

4. A video image creation system as in claim 1 wherein said store for storing picture point video signals representing picture points of said image comprises a frame delay store having a reading cycle period and being updated once per reading cycle period.

5. A video image creation system as in claim 1 wherein said updating means comprises means for combining for each designated point in said line, said color video signal provided by said input means with said picture point video signals stored for said each point in said image in said store, in proportions dependent on said combined signals representing the video effects of successive overlapping brush stamps at the respective designated picture point.

6. A video image creation system as in claim 1 wherein said store for storing picture point video signals representing picture points of said image comprises a frame delay store having a refresh cycle, and said updating means comprises means for updating the stored video signals stored in the store during said refresh cycle.

7. A video image creation system as in claim 1 wherein said store for storing picture point video signals representing picture points of said image comprises a random access store and wherein said updating means comprises means for updating said stored picture point video signals during video blanking intervals.

8. A video image creation system comprising:

operator controlled means for designating points on a line to be produced in an image;

means for generating signals representing a distributing power of an artist's implement at points within an area representing a brush stamp;

means for combining said signals representing the distributing power of an artist's implement to produce combined distribution signals representing a combined video effect of a plurality of said brush stamps wherein the brush stamps within said plurality are at relative positions related to respective points which are along the line and have been designated by said operator controlled means in each respective one of successive video frame periods;

input means for providing a color video signal;

a frame delay store for storing picture point video signals representing said image;

means for cyclically reading said stored picture point video signals from said store in said successive video frame periods; and means for sequentially updating at least some of said picture point video signals stored in said frame delay store once per video frame period, said means for sequentially updating including means for combining said color video signal from said input means with at least some of the picture point video signals stored in said frame delay store at locations which correspond to the respective points designated in said video frame period, in proportions determined by said combined distribution signals for the video frame period.

9. A video image creation system comprising:

operator controlled means for designating points on an image;

means for generating successive brush stamp signals representing successive brush stamps to be used in the image;

means for providing a color signal representing a selected color;

means for providing multiplying factors relating to said successive brush stamp signals for a point on the image to generate a signal representing an effect of overlapping brush stamps;

a store for storing color picture point video signals representing the image;

means for updating said color picture point video signals stored in said store at intervals;

said means for updating said color picture point video signals stored in said store being responsive to said color signal representing a selected color and to said signal representing the effect of overlapping brush stamps.

10. An image creation system as in claim 9 wherein said operator controlled means comprises a touch tablet and a stylus and wherein said means for generating said successive brush stamp signals includes means for varying the generation of said brush stamp signals in response to pressure on the stylus.

11. A system as in claim 9 wherein said store comprises a frame delay store.

12. A system as in claim 8 further comprising:

subtractor means for producing a resultant signal representing unity minus said combined distribution signals representing the video effect of a plurality of said brush stamps at each of said designated points;

means for combining said color video signal provided by said input means with picture point video signals stored in said frame delay store in proportions determined by said resultant signal.

13. A video image creation system comprising:

a store for video signals representing image points on an image;

means for setting up a signal representing a desired color;

means for producing brush stamp signals for respective overlapping brush stamp positions defining a stroke in said image;

said brush stamp signals for each respective one of said overlapping brush stamp positions comprising distribution signals representing a desired distribution of said color over a brush stamp area;

means for combining the distribution signal to produce combined video effect signals for respective points in said stroke, wherein the combined video effect signals for respective points in said stroke comprise contributions from the distribution signals for the brush stamps that overlap at said respective points; and means for updating the video signals in said store for at least some of said image points in response to: (i) the respective stored video signals for the respective points; (ii) said signal representing a desired color; and (iii) the respective combined video effect signal.

14. A system comprising:

a touch tablet and a stylus for designating a line of points in an image;

a source of brush stamp signals defining a selected distribution of a selected video characteristic over a brush stamp;

a computer circuit responsive to the line of points designated in a video frame period and to the brush stamp signals to produce combined distribution signals representing the effect of overlapping brush stamps each including a respective one of the points designated in said video frame period;

a cyclic frame delay store for storing color picture point video signals representing the points of an image;

a source of a color video signal representing a desired color;

a processor which is coupled to the cyclic frame delay store, the source of the color video signal and the computer circuit, wherein said processor: (i) updates picture point video signals from the cyclic frame delay store with said color video signal, in proportions determined by said combined distribution signals for positionally related respective image points; and (ii) stores the so-updated said color picture point video signals back in the cyclic frame delay store.

15. A system as in claim 14 in which the source of the brush stamp signals comprises a shape RAM for storing signals defining a selected intensity distribution over an area, and the computer circuit comprises an area RAM for storing the combined distribution signals defining an intensity distribution over an area of the image defined by overlapping brush stamps corresponding to the points of the line which are designated in one video frame period.

16. A system as in claim 15 in which said source of color video signals comprises a patch RAM storing said color video signal for image points in a selected color.

17. A system as in claim 16 in which the processor comprises a subtractor which for an image point to be updated subtracts the color picture point video signal stored for that point in the cyclic frame delay store from the corresponding color video signal from the patch RAM, a multiplier which multiplies the result of the subtraction by a factor related to said combined distribution signal derived for that point from the shape RAM, and an adder which adds the result of the multiplication to the respective color picture point video signal for that point stored in the cyclic frame delay store, and said cyclic frame delay store stores the result of the addition in a location in the cyclic frame delay store for that point, in place of the previous contents of said location.

18. A system as in claim 17 including a display for displaying the image stored in the cyclic frame delay store on the basis of the updated image points.

19. A method comprising the steps of:

providing an image made up of image points;

providing brush signals defining a selected distribution of a selected video characteristic over a brush stamp;

designating points on a line in said image for placement of said brush stamp at each designated point in the line, wherein successive points in the line are closer to each other than the size of said brush stamp and therefore the placement of the brush stamp at successive points in the line produces overlapping brush stamps;

combining the brush stamp signals defining the portions of the overlapping brush stamps to derive combined brush signals for the respective points of the image which are overlaid by the overlapping brush stamps; and combining the image points overlaid by the overlapping brush stamps with said combined brush signals to derive a modified image.

* * * * *